United States Patent [19]

Knobl et al.

[11] 4,271,454
[45] Jun. 2, 1981

[54] CAPACITOR OF DISK SHAPE WITH LIQUID COOLING

[75] Inventors: Alois Knobl, Selb; Alfred Zeitner, Hohenberg; Helmut Krockow, Hof; Hermann Schmaus, Selb, all of Fed. Rep. of Germany

[73] Assignee: Draloric Electronic GmbH, Fed. Rep. of Germany

[21] Appl. No.: 16,955

[22] Filed: Mar. 5, 1979

[30] Foreign Application Priority Data

| Mar. 14, 1978 | [DE] | Fed. Rep. of Germany | ... 7807683[U] |
| Apr. 27, 1978 | [DE] | Fed. Rep. of Germany | ... 7812819[U] |
| Jul. 22, 1978 | [DE] | Fed. Rep. of Germany | ... 7822053[U] |
| Oct. 20, 1978 | [DE] | Fed. Rep. of Germany | ... 7831244[U] |

[51] Int. Cl.³ .............................................. H01G 1/08
[52] U.S. Cl. ..................................... 361/274; 361/321
[58] Field of Search ................................ 361/274, 321

[56] References Cited

U.S. PATENT DOCUMENTS

| 1,390,020 | 9/1921 | Cheney | 361/306 X |
| 2,326,151 | 8/1943 | Marbury | 361/274 |
| 2,492,747 | 12/1949 | Herr | 361/274 X |
| 2,504,281 | 4/1950 | Spanne | 361/274 |

FOREIGN PATENT DOCUMENTS

| 1137804 | 10/1962 | Fed. Rep. of Germany | ........... 361/274 |
| 454542 | 10/1936 | United Kingdom | ..................... 361/274 |
| 749438 | 5/1956 | United Kingdom | ..................... 361/274 |

*Primary Examiner*—E. A. Goldberg

[57] ABSTRACT

A liquid cooled capacitor includes a disk comprised of a dielectric, e.g., ceramic, material. On both opposite surfaces of the disk are applied a respective electrode. For cooling each of the electrodes, there is a liquid cooling chamber above it. In one embodiment, there is a contact plate at the base of the liquid cooling chamber. The liquid cooling chamber can receive a circulating flow of liquid therein, and the cooling of the contact plate by the liquid will in turn cool the electrodes. Diametrically oppositely positioned liquid connections to the liquid chamber effect cooling liquid circulation. There is a cover spaced away from the contact plate of the cooling liquid chamber which encloses that chamber. The cooling liquid chamber has a peripheral side wall that extends up from the cooling plate to the spaced away cover. In an alternate embodiment, the liquid chamber includes a plurality of annular liquid coolant-carrying tubes. Diametrically oppositely positioned chambers receive the coolant and distribute same among the cooling tubes. In other embodiments, insulating material is applied around the external periphery of the capacitor and outside the disk, the peripheral walls of the cover plates above the electrodes and outside the periphery of the covers themselves.

5 Claims, 18 Drawing Figures

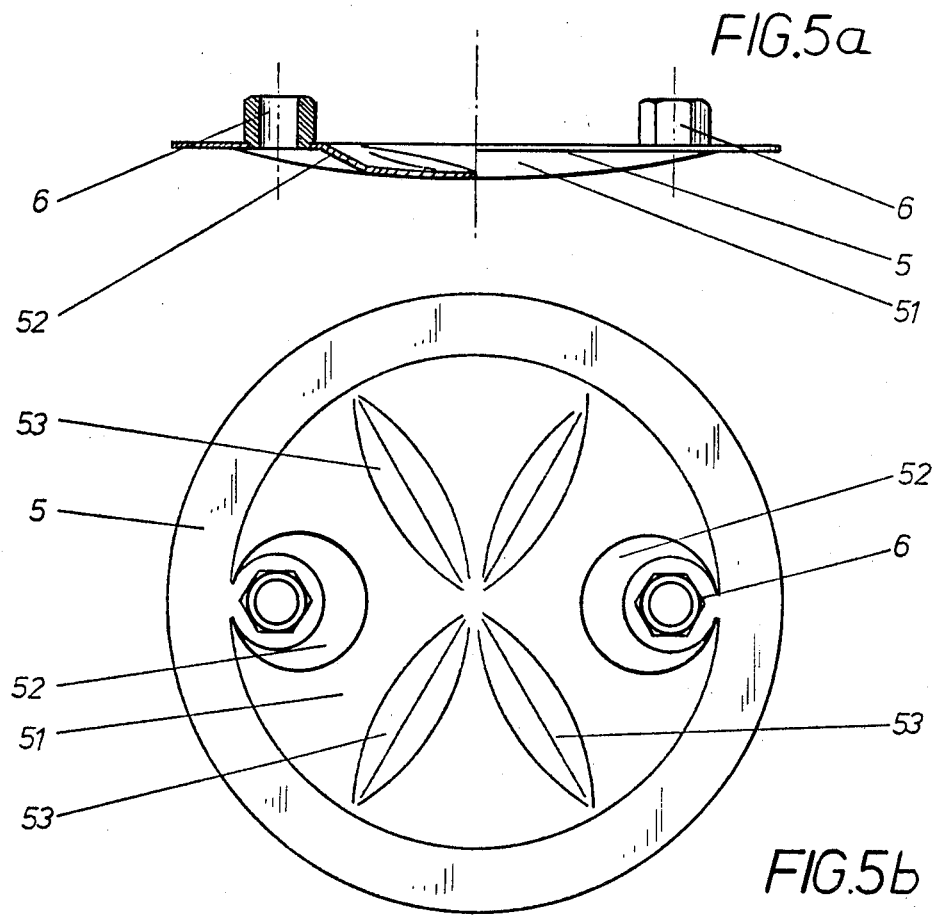
FIG.5a
FIG.5b
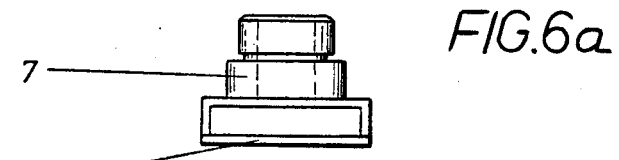
FIG.6a
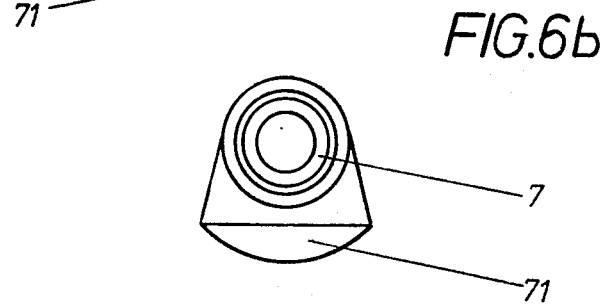
FIG.6b

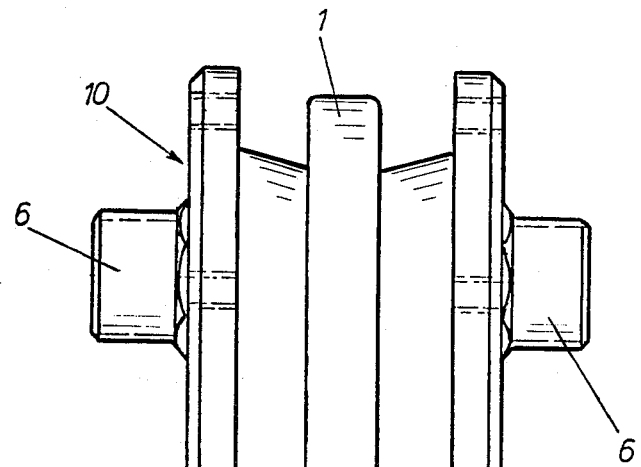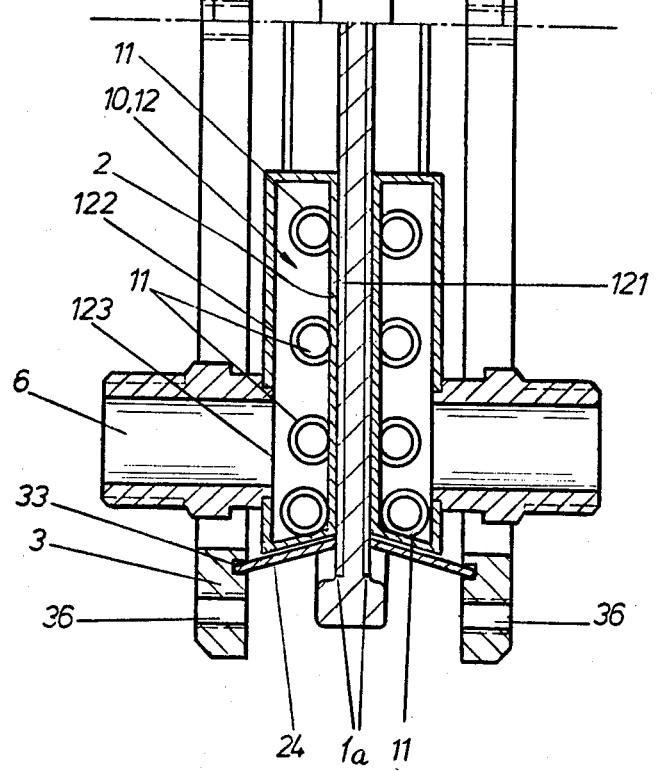
FIG.8

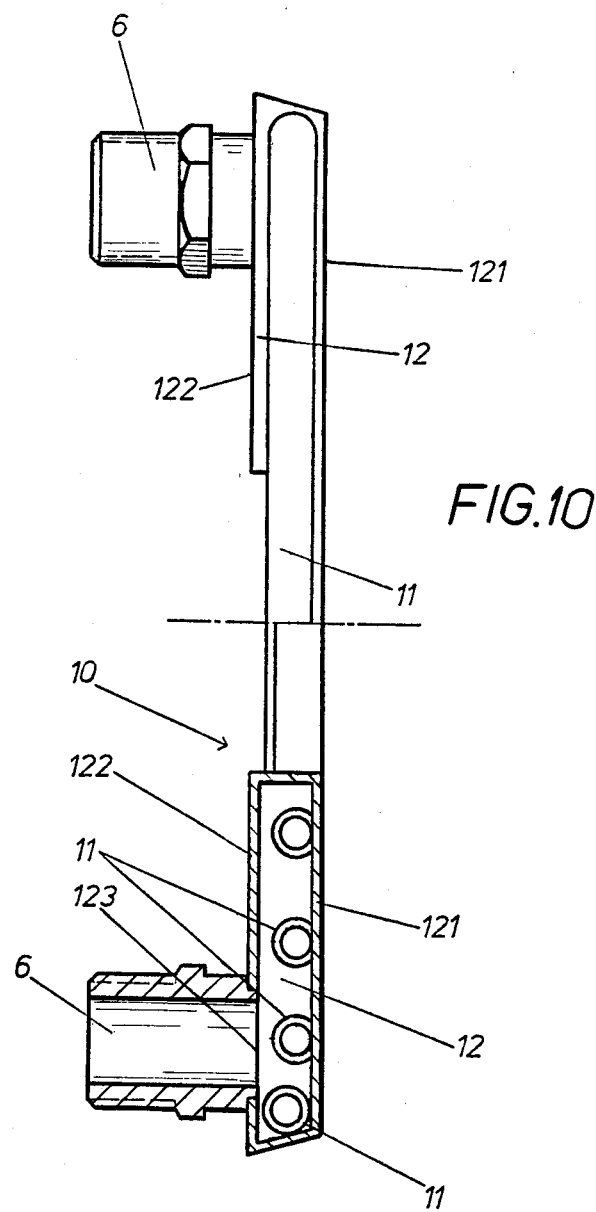

CAPACITOR OF DISK SHAPE WITH LIQUID COOLING

BACKGROUND OF THE INVENTION

This invention relates to a disk-shaped ceramic capacitor, with liquid cooling means, particularly comprised of cooling elements which are fastened to the electrodes of the capacitor and which are provided with connections for the circulation of the cooling liquid. Such a capacitor is useful for high-frequency industrial generators.

One such capacitor is known from West German Provisional Patent Auslegeschrift 1 137 804. In that patent the respective cooling capsule for each of the two electrodes is formed of parts that are open on one side and which consist of an annular edge portion and a cover and are connected permanently with each other. The cooling liquid flows in a straight line onto the electrodes of the capacitor and the narrow edge of the cooling capsules is provided to take up the mechanical forces. As a result the metal electrodes are heavily stressed at these places.

German Pat. No. 705 022 discloses a liquid-cooled electrical capacitor which consists of a plurality of ceramic plates which are metallized on both sides and held apart by rings.

An arrangement comprised of a plurality of liquid-cooled electrical capacitors placed one above the other, is also known from U.S. Pat. No. 2,504,281.

SUMMARY OF THE INVENTION

The object of the invention is to improve a capacitor of the foregoing type. Such a capacitor is of low self-inductance so that it can be used for oscillatory circuits of high frequency generators of high electrical power.

Another object of the invention is to enable high coolant pressure to be used with a liquid-cooled capacitor.

A further object of the invention is to improve the resistance to electrical breakdown and to moisture of liquid-cooled disk capacitors.

The advantages obtained by the present invention result from both the large area of contact between the capacitor electrodes and the contact elements and the fact that the contact elements are formed of a material exhibiting good thermal conductivity and high electrical conductivity. This enables very good removal of heat by the coolant, and increased current capacity is assured. Furthermore, due to the special shape of the cooling elements according to the invention, the use of high coolant pressures is possible, whereby the removal of heat by the coolant is enhanced and the current capacity of the capacitor can be increased. Another advantage also resides in the simple construction of and the technique of connection of the individual parts of the cooling chambers. Further, such a capacitor can be used at higher rated voltages. Such a capacitor can even be used in open industrial plants, which are subject to dust.

Other objects and features of the invention are described below and are shown in the accompanying drawings.

BRIEF DESCRIPTION OF THE DRAWINGS

FIG. 3b is a plan view of the contact plate of FIG. 3a;

FIG. 5a is an elevational view, partially in section, of a cover for the capacitor of FIG. 1;

FIG. 5b is a plan view of the cover of FIG. 5a;

FIG. 6a is an elevational view of a nozzle for the capacitor of FIG. 1;

FIG. 6b is a plan view of the nozzle of FIG. 6a;

FIG. 8 is an elevational view of a third embodiment of a capacitor according to the invention;

FIG. 9b is a fragmentary plan view of the contact plate and cover of FIG. 9a;

FIG. 10 is an elevational view, partially in section, of the cooling means for the third embodiment of capacitor of FIG. 8;

DESCRIPTION OF THE PREFERRED EMBODIMENTS

Figure 1:
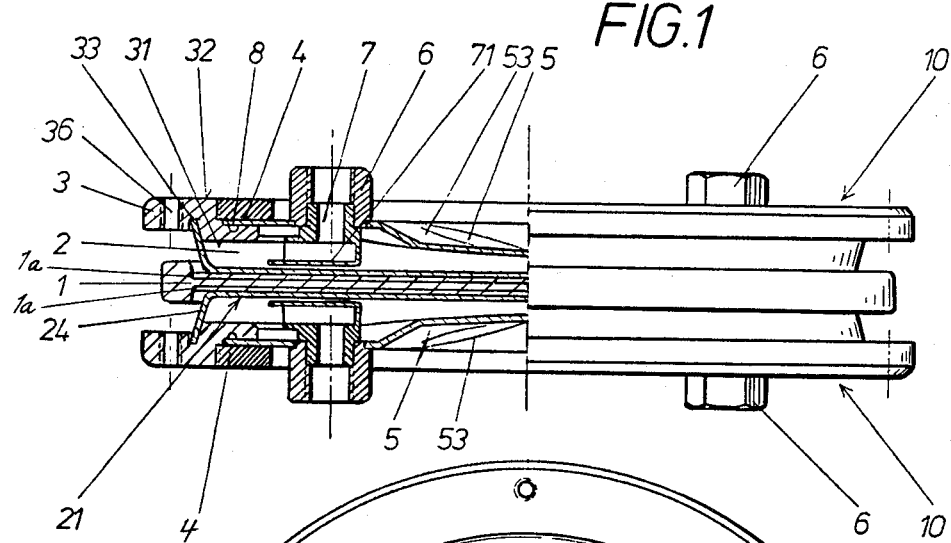
FIG. 1 is a front elevational view, partly in section, of a first embodiment of a capacitor according to the invention.
Figure 2:
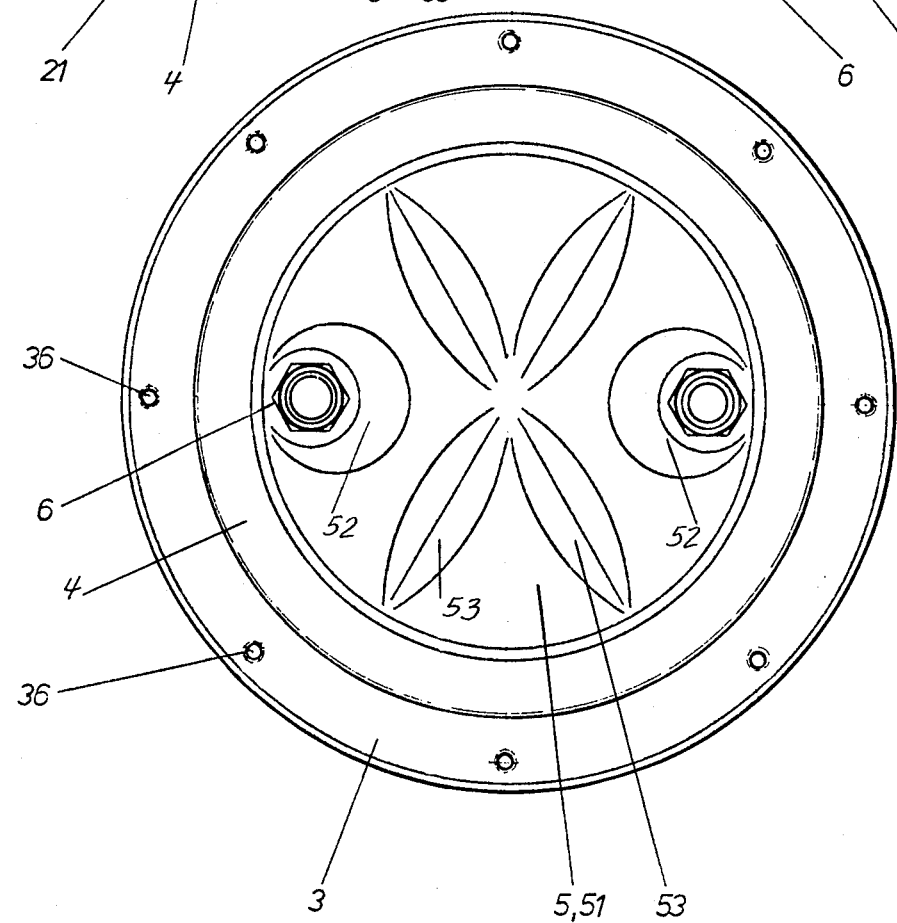
FIG. 2 is a plan view of the capacitor of FIG. 1.

FIG. 1 provides an edge view of a disk-shaped, electrically non-conductive or dielectric capacitor body 1 comprised, for instance, of a ceramic. The material body 1 has an enlarged bead edge. Very thin metal layers 1a are formed on opposite, flat main surfaces of body 1 and define respective capacitor electrodes. The bottom 21 (FIG. 3) of a respective cup or dish-shaped contact plate 2 is in contact with each metal layer 1a. The layers 1a and contact plate 2 are secured together by soldering. The upstanding, somewhat outwardly flaring annular side 24 of each contact plate 2 has an upper edge that fits in a groove 33 in the inwardly facing bottom side 31 of a respective annular edge part 3 (FIG. 4) on each side of the capacitor. The edge of the side 24 is soldered in the groove 33 in a mechanically strong and water-tight manner. There is a respective cover 5 on each side of and above the bottom surface 21 of the respective plate 2 and positioned in a respective annular depression 34 in the top side at the annular edge portion 3. The depression 34 has a threaded side wall. The cover extends radially out past and around the below described liquid flow connection 6 and extends over the annular sealing ring 8 which is embedded in a groove 35 provided therefor in the outwardly facing side of the edge part 3. The edge of the cover 5 is pressed by the threaded ring 4 against the sealing ring 8 as the ring 4 is threadedly tightened into the depression 34.

There are two diametrically opposite connections 6 in each of the two annular edge portions 3. Into each connection is screwed a nozzle 7, which includes baffle plate 71 beneath the entrance to the nozzle and above the bottom 21 of the plate 2 for deflecting the flow of coolant in through the nozzle 7. This prevents the incoming coolant from flowing directly against the capacitor body 1, which could damage it.

Figure 3A:
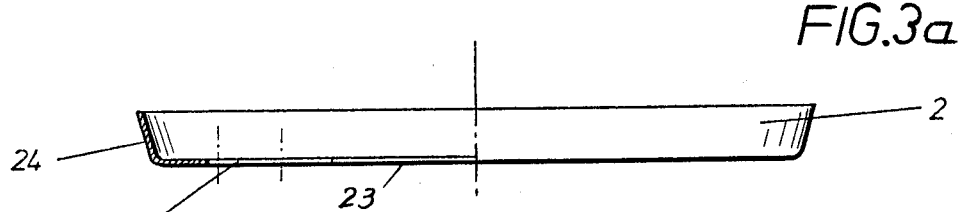
FIG. 3a is an elevational view of a contact plate of the capacitor of FIG. 1.
Figure 3B:
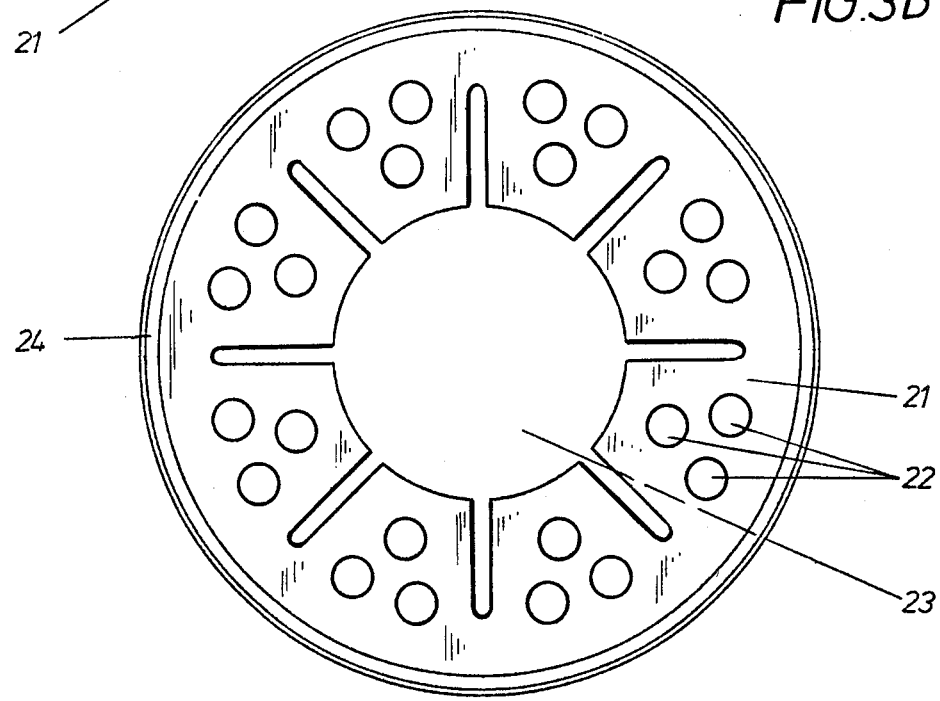

Referring to FIG. 3, the contact plate 2 has a central, circular opening through it, from which eight regularly spaced finger openings radiate radially outwardly, making the opening 23 generally star-shaped. In addition, a plurality of bore holes 22 pass through the bottom 21. The contact plate 2 is a deep-drawn component, comprised of a material of good thermal conductivity, for instance copper plate, and it has an obliquely ascending side edge 24.

Figure 4:
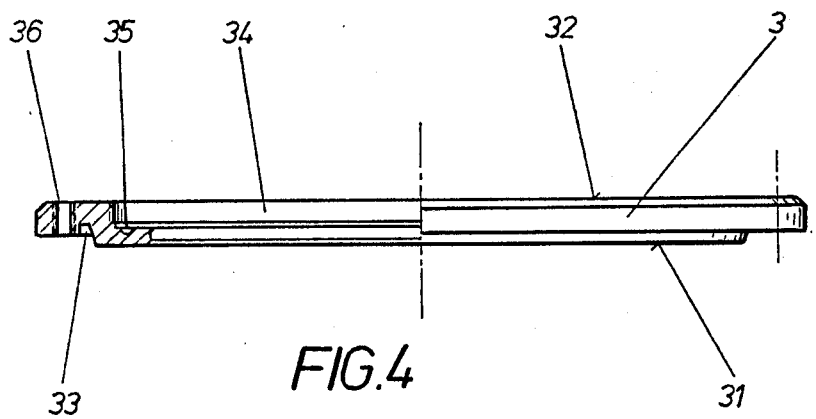
FIG. 4 is an elevational view, partially in section, of an annular edge portion of the capacitor of FIG. 1.

Referring to FIG. 4, the annular edge part 3 is provided on its inward or bottom side 31 with a circumferential groove 33 and on its top or outward side 32 with a depression 34. The depression 34 has a threaded periphery. At the bottom of the depression, there is a circumferential groove 35 to receive the packing ring 8. Slightly in from the periphery of the annular edge portion 3, there are a plurality of threaded bore holes 36 which make it possible to fasten the capacitor to a mounting device (not shown) and/or assemble together several capacitors.

Referring to FIG. 5, the cover 5 is comprised of stainless steel plate. It has a broad concave indentation 51 across virtually the entire diameter of the cover, and from which there extend two diametrically opposite, flat top platforms 52. On each platform 52, a respective hexagonal nut is permanently fastened to serve as a connection 6. Radially extending ribs 53 formed in the indentation 51 serve for mechanical stiffening of the cover 5. Into each hexagonal nut of a connection 6 there is screwed a nozzle 7, like that shown in FIGS. 6a and 6b.

Figure 7:
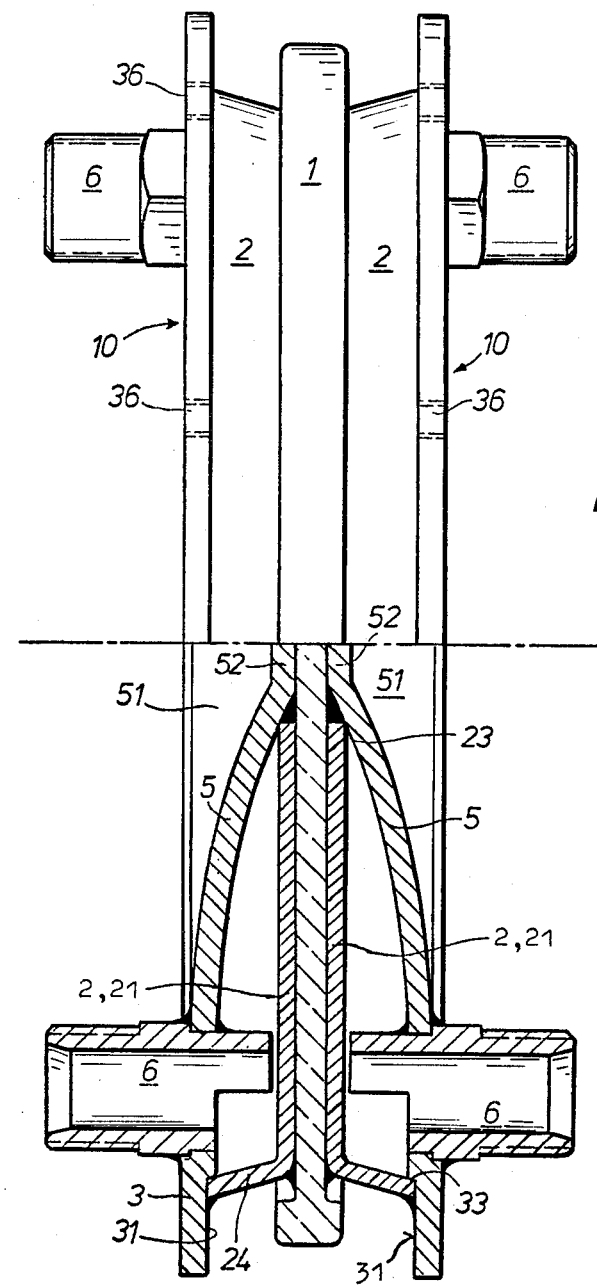
FIG. 7 is an elevational view of a second embodiment of a capacitor according to the invention.

FIG. 7 shows a second embodiment of a capacitor according to the present invention. Corresponding elements to the first embodiment have the same numerals. A disk-shaped non-conductive capacitor body 1 with a bead edge is provided with a metal coating of a capacitor electrode 1a on each of its two principal opposite surfaces. Respective disk-shaped contact plates 2 are soldered via their bottoms 21 to the metal layers. The side part 24 of the contact plate 2 has an outer free edge which is fitted to a shoulder 33 on the inwardly facing, bottom 31 of the annular edge part 3, and the side part is connected there in a mechanically strong and waterproof manner.

Here, the edge part 3 of the cover is an integral extension of the cover 5 making them a one piece cover means 3, 5. Each cover 5 has two diametrically opposite connections 6. The cover 5 is connected toward its central region with the bottom 21 of the contact plate 2. By the connection of the cover 5 with the bottom 21 in the central region 52, a high compressive strength is obtained for the cooling capsule 10. In the annular edge part 3, along the circumference, there are a plurality of threaded boreholes 36 which serve for fastening of the capacitor on a mounting device and/or for the assembling together of several capacitors.

FIGS. 8-11 show a third embodiment of a capacitor according to the invention. Again, corresponding elements to the first embodiment have the same reference numerals. A disk-shaped non-conductive capacitor body 1 is provided with metallic electrodes 1a coated on its opposite surfaces. In place of the simple chamber through which a pool of coolant can be deposited and flow, as covered in the previous embodiments, there are cooling pipes 11 which lie above the plane of the electrodes 1a and are fastened to the said electrodes. The concentric cooling pipes 11 open into two respective, diametrically opposite, separated chambers 12 for each electrode 1a and the base surface 121 of each chamber 12 is soldered fast to its respective electrode 1a. The surface 122 of each chamber 12 opposite the base surface 121 has an opening 123 in which a connection 6 is fastened. The chambers 12 are fitted in respective recesses of the contact plate 2 and are fastened to the plate 2.

Figure 9A:
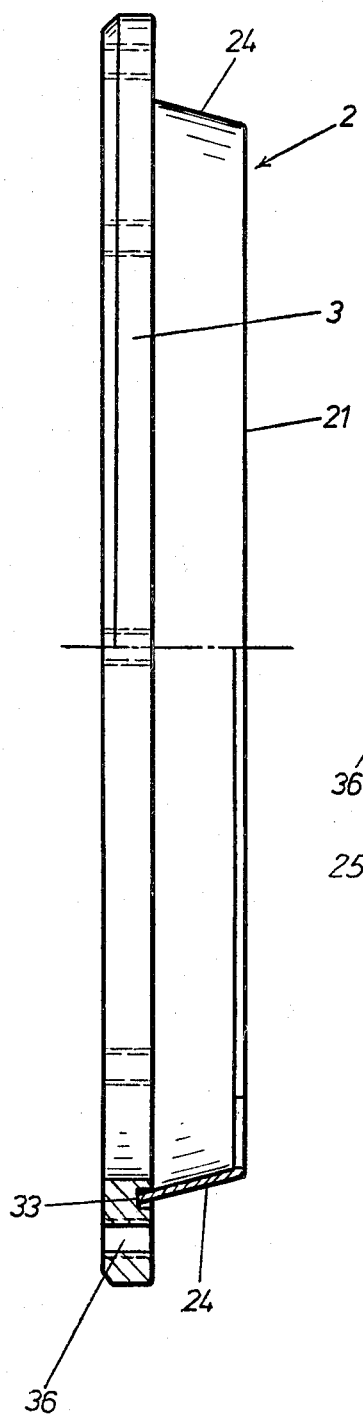
FIG. 9a is an elevational view, partially in section, of a contact plate and cover for use in the third embodiment of capacitor of FIG. 8.
Figure 9B:
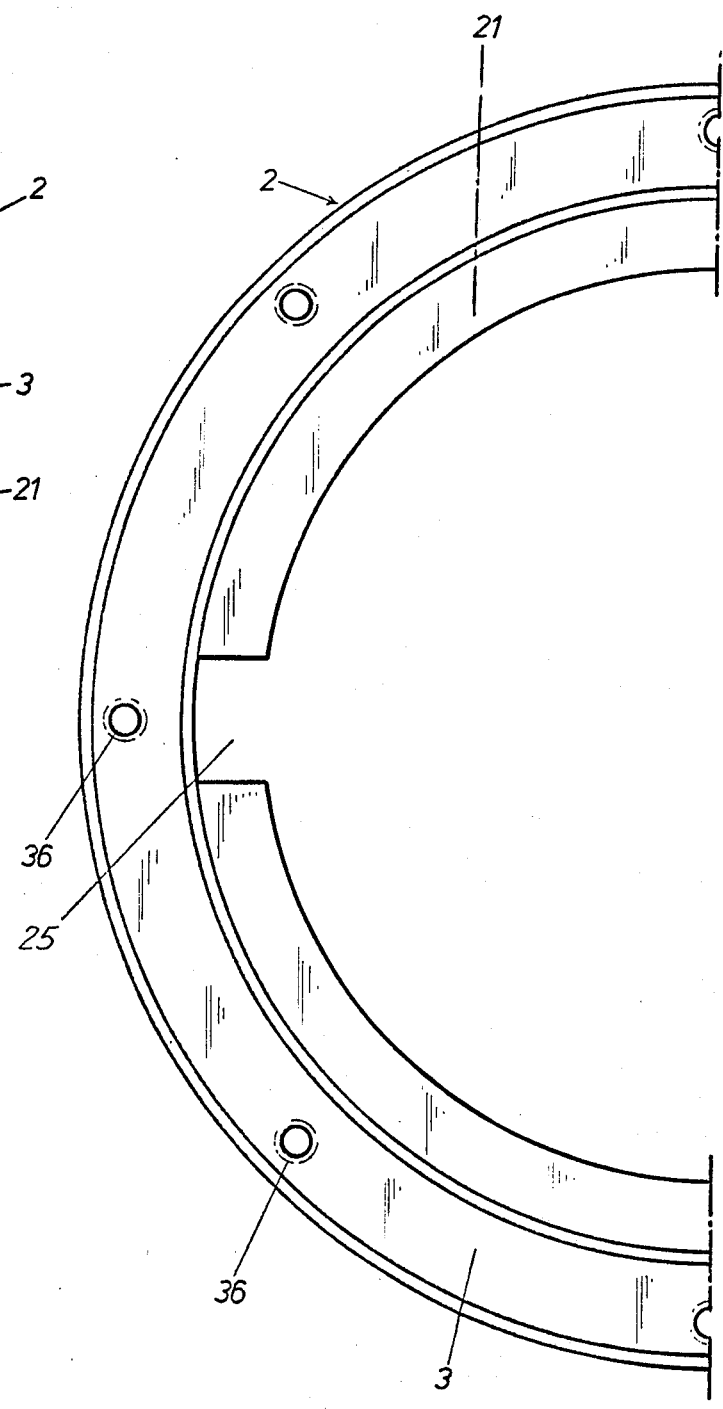
Figure 11:
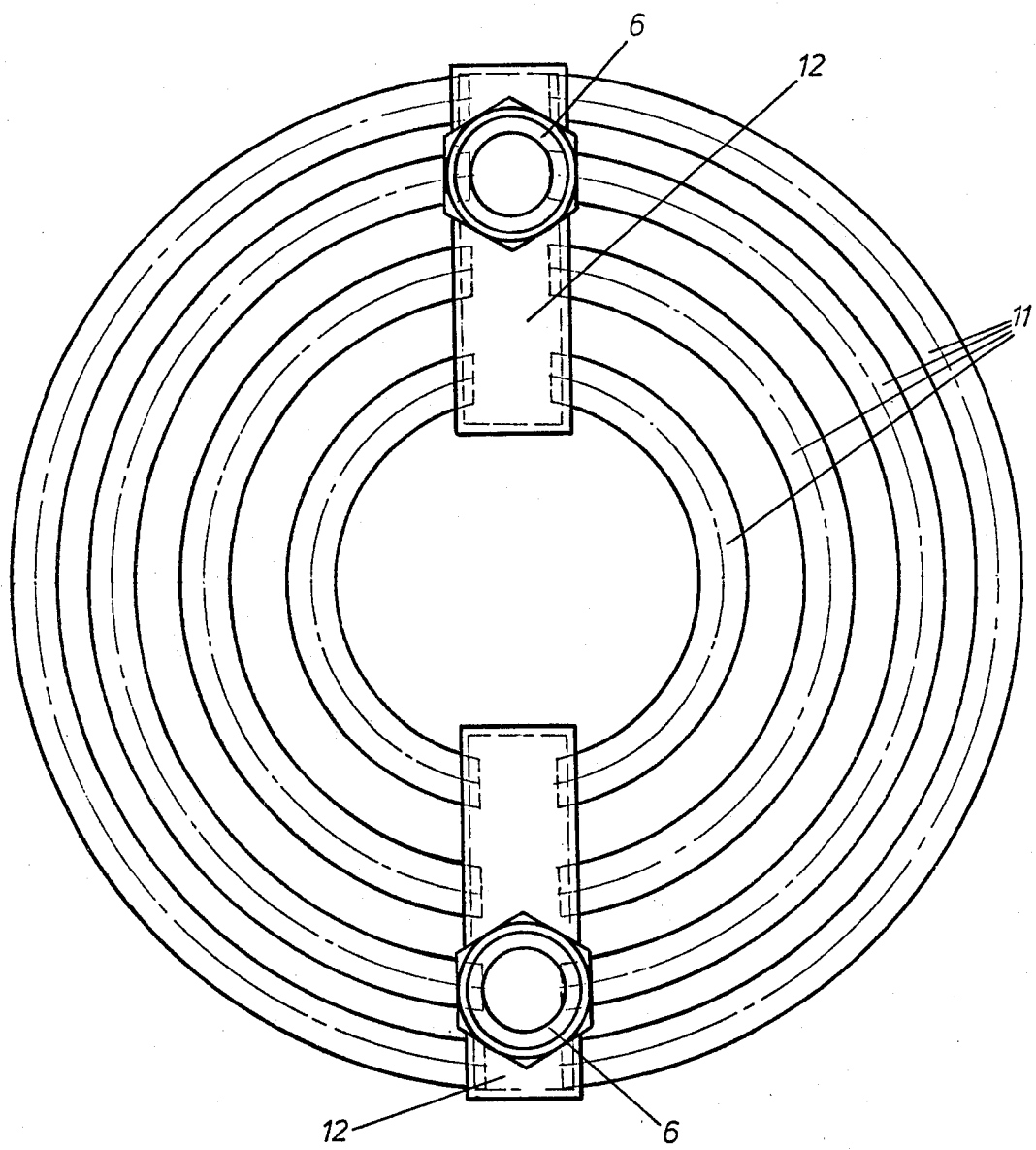
FIG. 11 is a plan view of the cooling means of the third embodiment of capacitor of FIG. 8.

Each contact plate 2 is comprised of a contact ring 21 having an oblique side wall 24 with an upper edge which terminates in a groove 33 in the annular edge part 3 and is fastened therein, as can be seen from FIG. 9a. FIG. 9b shows the diametrically opposite recesses 25 in the contact ring 21, which recesses are adapted to the width dimensions of the chambers 12, as shown in FIG. 11. Threaded bore holes 36 in the annular edge part 3 serve for the attaching of this capacitor to a mounting device and/or for the assembling of several capacitors together to form a battery of capacitors.

FIGS. 10 and 11 show a cooling element 10 for the third embodiment and comprising a plurality of concentrically arranged radially spaced apart cooling pipes 11, all of which empty into the two diametrically opposite chambers 12. The cooling pipes 11 and the base surface 121 of the two chambers 12 lie in a common plane. In the upper surface 122 of each chamber 12, there is an opening 123 in which there is fastened a connection 6. The connections 6 are intended for the entrance and departure respectively of the cooling liquid.

Figure 12:
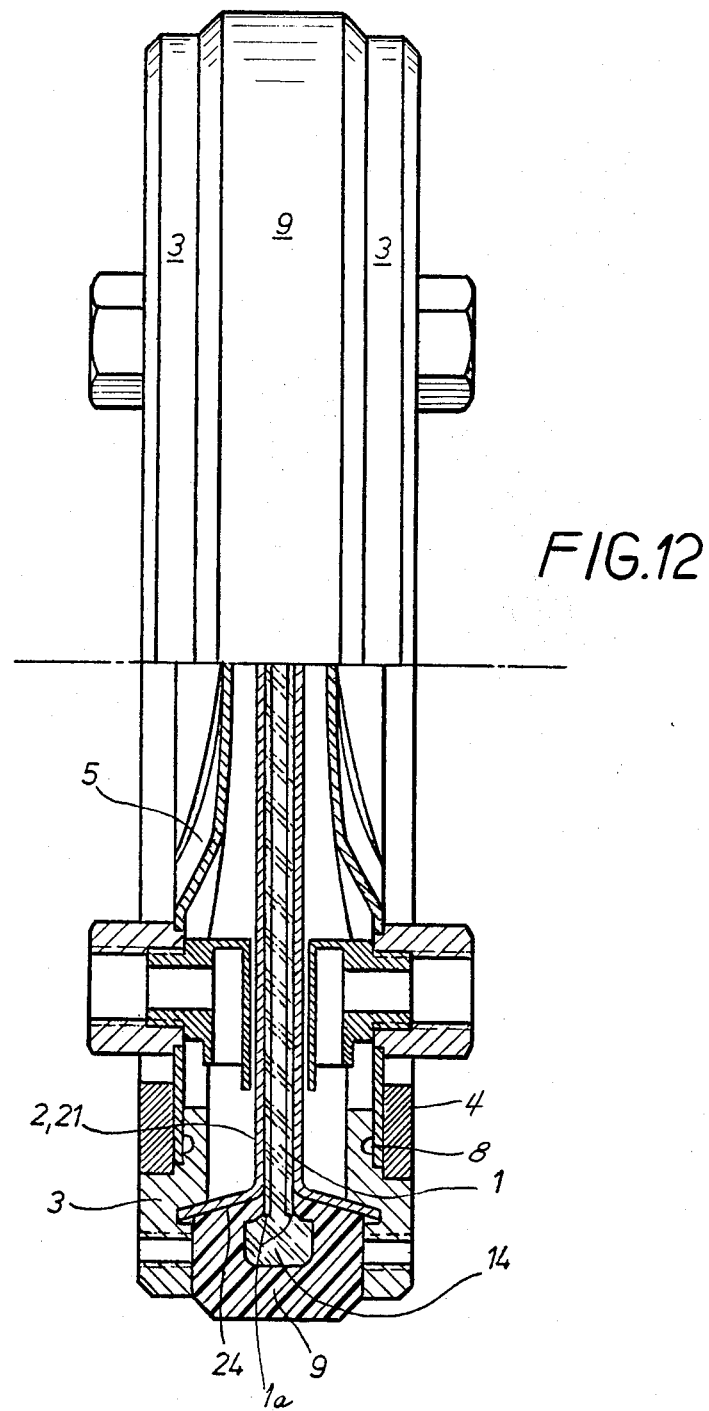
FIG. 12 is an elevational view, partially in cross-section, of a fourth embodiment of the capacitor according to the invention.

FIG. 12 shows a fourth embodiment of a capacitor according to the invention. Again, the same reference numerals are used for elements corresponding to those of the first embodiment. The structure of this embodiment substantially corresponds to that of the first embodiment of FIG. 1. A disk-shaped capacitor body 1 with bead edge 14 has a metal layer 1a of a capacitor electrode on each of its two flat, opposite, principal surfaces. The disk-shaped contact plates 2 are soldered by means of their bottoms 21 to the respective metal layers 1a. The upwardly bent side wall 24 of the contact plate 2 is received in an annular edge part 3 of the cover means and is soldered there in a mechanically strong and water-tight manner. The cover 5 with the connections 6 for the circulating coolant lies in a depression in the annular edge part 3 on a packing ring 8 and is pressed against the packing ring by a threaded ring 4. For insulating the edge of the capacitor body 1, it is completely surrounded by an electrically insulating, cured plastic 9, comprised for instance of silicone rubber, which fills up the space defined between the two annular edge parts 3 and the upwardly bent side walls 24 of the contact plates 2.

Figure 13:
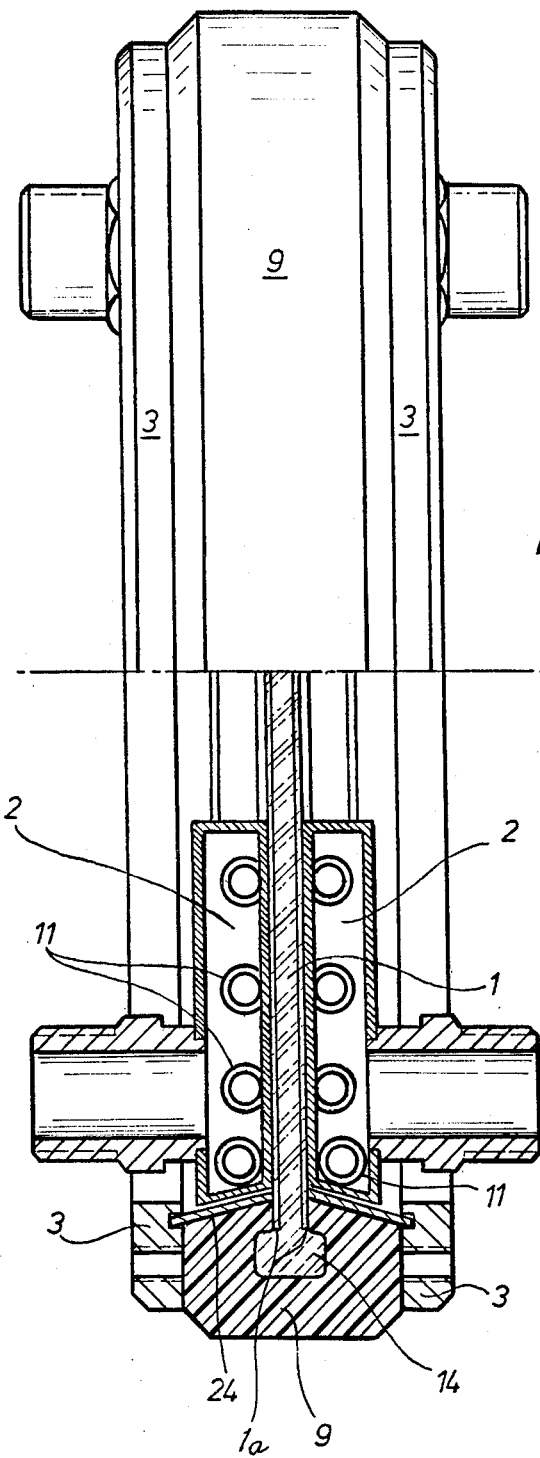
FIG. 13 is an elevational view, partially in section, of a fifth embodiment of a capacitor according to the invention.

FIG. 13 shows a fifth embodiment of a capacitor according to the invention. The same comments apply as to the reference numerals. This embodiment substantially corresponds to the third embodiment of FIG. 8. A disk-shaped capacitor body 1 is provided with metallic electrodes 1a on its surfaces. The cooling pipes 11 which lie above the plane of the electrodes 1a are soldered fast to the electrodes. The concentric cooling pipes 11 empty into chambers 12 whose base surfaces are soldered to the respective electrodes 1a. The surfaces of the chambers 12 opposite the base surface have respective openings in which connections 6 are fastened.

Each contact plate 2 has an oblique side wall 24 which terminates in a groove in the annular edge part 3 of the cover means and is fastened therein. In the same way as in the fourth embodiment of FIG. 12, the space between the two annular edge parts 3 and the oblique walls 24 of the plates 2 is filled with an electrically insulating cured plastic 9 comprised, for instance, of silicone rubber.

Figure 14:
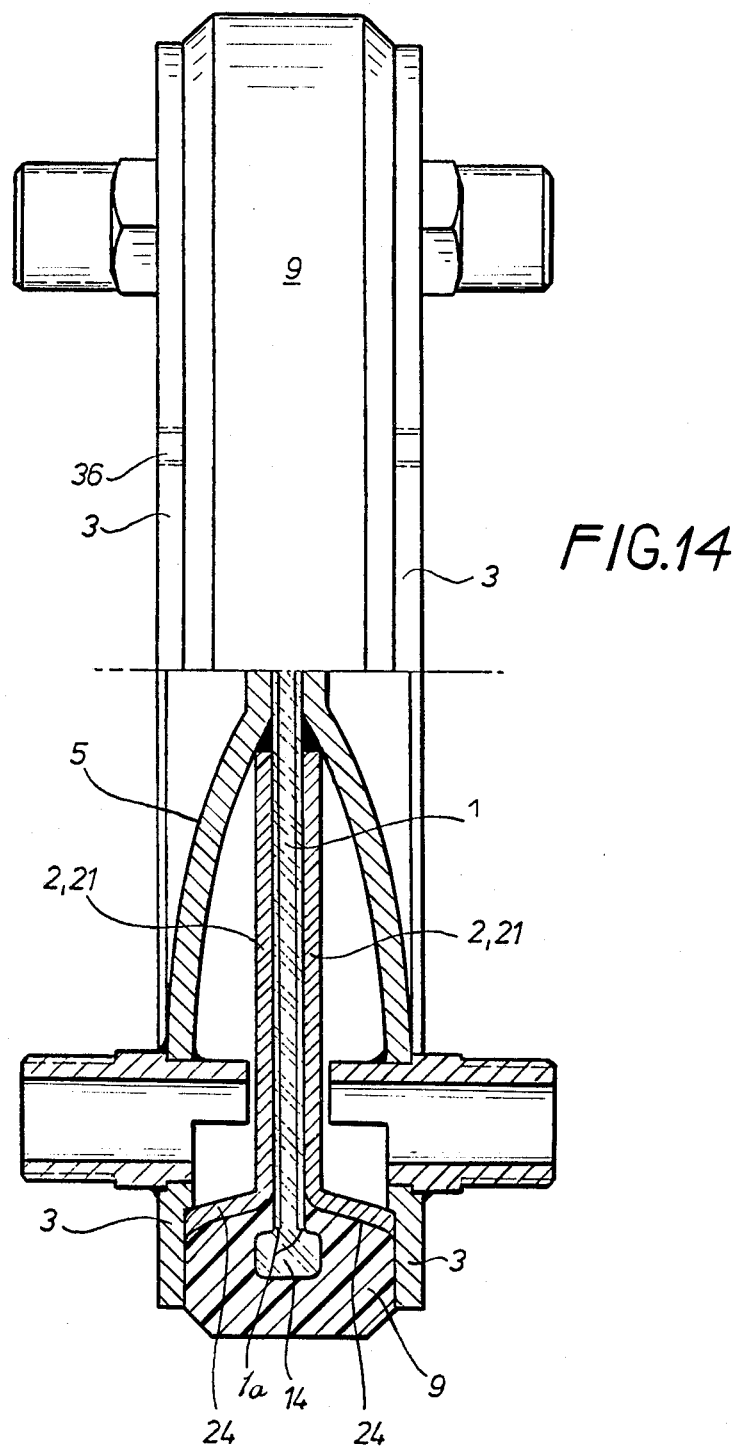
FIG. 14 is an elevational view, partially in section, of a sixth embodiment of a capacitor according to the invention.

FIG. 14 shows a sixth embodiment of a capacitor according to the invention. The same comments apply as to the reference numerals. This embodiment substantially corresponds to the second embodiment of FIG. 7. A disk-shaped capacitor body 1 with a bead edge 14 has the metal layers of a capacitor electrode 1a on each of its two opposite, flat, principal surfaces. A respective disk-shaped contact plate 2 is soldered by means of its bottom 21 to each metal layer 1a. The edge 24 of the contact plate 2 is fitted to a shoulder in the bottom of the annular edge part 3 of the cover 5 and is attached there in a mechanically strong and water-tight manner. Each cover 5 has two diametrically opposite connections 6 and is connected in its central region with the bottom 21 of the contact plate 2. By the connection in the central region with the bottom 21, a high compressive strength is obtained for the cooling capsule. In the annular edge part 3, along the circumference, there are a plurality of threaded bore holes 36, which serve for the attachment of the capacitor on a mounting device and/or for the assembling together of several capacitors. Electric insulation 9 surrounds the insulating edge of the capacitor 1 completely between the two annular edge parts 3 and the walls 24 of the contact plates 2.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A water cooled capacitor, comprising:
(A) a disk made of a dielectric material, said disk having first and second opposed flat main surfaces;
(B) first and second electrodes located on said first and second main surfaces, respectively, so as defined opposed electrodes of said capacitor;
(C) first and second cooling chambers connected to said first electrode at radially opposite locations of said disk;
(D) third and fourth cooling chambers connected to said second electrode at radially opposed locations of said disk;
(E) a first plurality of pipes extending from said first cooling chamber to said second cooling chamber, said first plurality of pipes each defining an arc of a respective circle which is co-axial with said disk, said first plurality of pipes being in contact with said first electrode and providing a fluid path extending between said first and second cooling chambers;
(F) a second plurality of pipes extending from said second cooling chamber to said first cooling chamber, said second plurality of pipes each defining an arc of a respective circle which is co-axial with said disk, said second plurality of pipes being in contact with said first electrode and providing a fluid path extending between said second and first cooling chambers;
(G) a third plurality of pipes extending from said third cooling chamber to said fourth cooling chamber, said third plurality of pipes each defining an arc of a respective circle which is co-axial with said disk, said third plurality of pipes being in contact with said second electrode and providing a fluid path extending between said third and fourth cooling chambers;
(H) a fourth plurality of pipes extending from said fourth cooling chamber to said third cooling chamber, said fourth plurality of pipes each defining an arc of a respective circle which is co-axial with said disk, said fourth plurality of pipes being in contact with said second electrode and providing a fluid path extending between said fourth and third cooling chambers;
(I) a first connection coupled to said first cooling chamber for enabling cooling liquid to be pumped into said first cooling chamber and a second connection coupled to said second cooling chamber for enabling cooling liquid to leave said second cooling chamber whereby liquid pumped into said first cooling chamber circulates through said first and second plurality of pipes, into said second cooling chamber and then out of said second cooling chamber; and
(J) a third connection coupled to said third cooling chamber for enabling cooling liquid to be pumped into said third cooling chamber and a fourth connection coupled to said fourth cooling chamber for enabling cooling liquid to leave said fourth cooling chamber whereby liquid pumped into said third cooling chamber circulates through said third and fourth plurality of pipes, into said fourth cooling chamber and then out of said fourth cooling chamber.

2. The water cooled capacitor of claim 1, further including:
first and second contact plates in contact with said first and second electrodes, respectively; and
first and second annular edge pieces associated with said first and second contact plates, respectively, each of said annular edge pieces having a groove formed therein, said first contact plate having an annular side wall extending from said first electrode into said groove formed in said first annular edge piece, said second contact plate having an annular side wall extending from said second electrode into said groove formed in said second annular edge piece.

3. The water cooled capacitor of claim 1, wherein said first, second, third and fourth plurality of pipes are all equal in number.

4. The water cooled capacitor of claim 3, wherein each pipe in said first plurality of pipes defines an arc of the same circle of a respective one of the pipes of said second plurality of pipes.

5. The water cooled capacitor of claim 4, wherein each of said pipes of said third plurality of pipes defines an arc of the same circle of a respective one of the pipes of said fourth plurality of pipes.

* * * * *